United States Patent [19]

Herst et al.

[11] E Patent Number: Re. 33,471

[45] Reissued Date of Patent: Dec. 4, 1990

[54] METHOD FOR INDIRECT LIGHTING

[75] Inventors: Douglas J. Herst, Ross; Peter Y. Y. Ngai, Lafayette, both of Calif.

[73] Assignee: Peerless Lighting Corporation, Berkeley, Calif.

[21] Appl. No.: 472,172

[22] Filed: Jan. 30, 1990

Related U.S. Patent Documents

Reissue of:

[64] Patent No.: 4,660,131
Issued: Apr. 21, 1987
Appl. No.: 840,099
Filed: Mar. 17, 1986

U.S. Applications:

[60] Division of Ser. No. 742,591, Jun. 7, 1985, Pat. No. 4,667,275, which is a continuation of Ser. No. 46,970, Jun. 8, 1979, abandoned.

[51] Int. Cl.[5] ..... F21S 3/00

[52] U.S. Cl. ..... 362/223; 362/309; 362/337

[58] Field of Search ..... 362/217, 219, 223, 260, 362/307, 308, 309, 311, 327, 328, 329, 330, 332, 335, 336, 337, 339, 340, 367, 257

[56] References Cited

U.S. PATENT DOCUMENTS

| | | | |
|---|---|---|---|
| 3,398,273 | 8/1968 | Rex et al. | 362/309 |
| 4,001,575 | 1/1977 | Sullivan et al. . | |
| 4,065,667 | 12/1977 | Ruud et al. | 362/217 |
| 4,390,930 | 6/1983 | Herst et al. | 362/224 |

FOREIGN PATENT DOCUMENTS

| | | | |
|---|---|---|---|
| 619084 | 3/1949 | United Kingdom | 362/340 |
| 924138 | 4/1963 | United Kingdom | 362/339 |

OTHER PUBLICATIONS

Peerless Electric Company, Photometric and Technical Information, Longlites by Peerless, 1977, pp. 82–95.

Electro-Systems, Inc., Power-Lume 800/1500, 1965, p. 5.

Holophane Company, Inc., Outdoor Substation Unit with Lens Top, D4252, 1966.

*Primary Examiner*—David A. Okonsky

*Attorney, Agent, or Firm*—Donald L. Beeson

[57] ABSTRACT

A method for indirectly illuminating an interior space is disclosed wherein a laterally extended overhead distribution of light is produced from a source of indirect lighting, such as a fluorescent indirect luminaire, by directing a portion of the source light upward to produce a luminance pattern on the ceiling surface directly overhead and then refracting substantially all of another portion of the source light laterally of the indirect luminaire so as to spread the refracted portion away from the directly overhead luminance pattern. Illustrated is a luminaire having trough-shaped lensed for achieving the method of the invention wherein the lateral portions of the lens act to refract the light laterally as above described, and the top lens portion is formed to diverge the light incidence thereon directly overhead in a substantially uniform luminance pattern which is extended by the light refracted through the lateral lens portions.

16 Claims, 2 Drawing Sheets

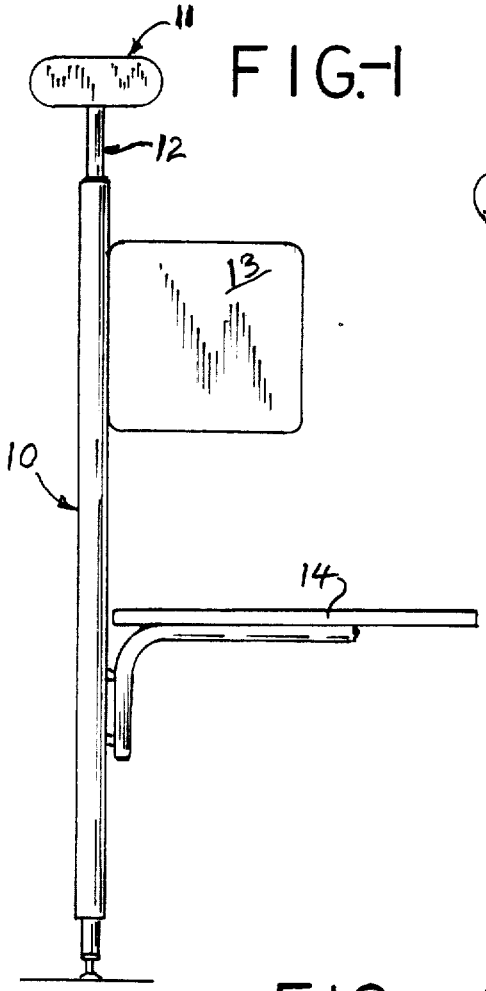
FIG.-1
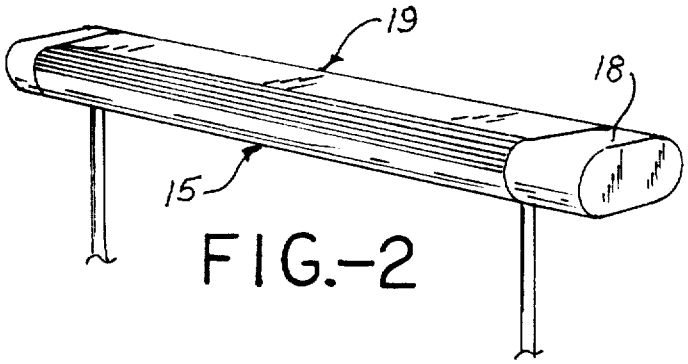
FIG.-2
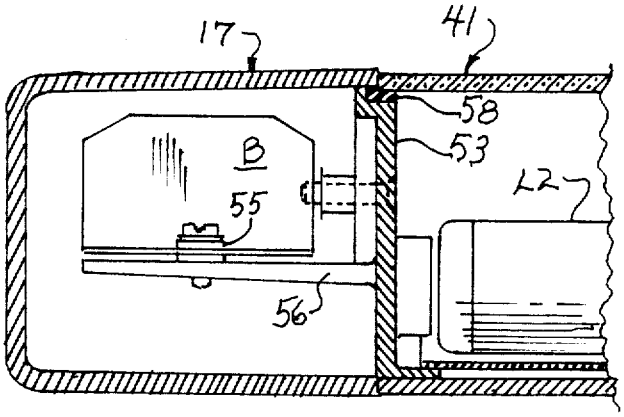
FIG.-4
FIG.-3
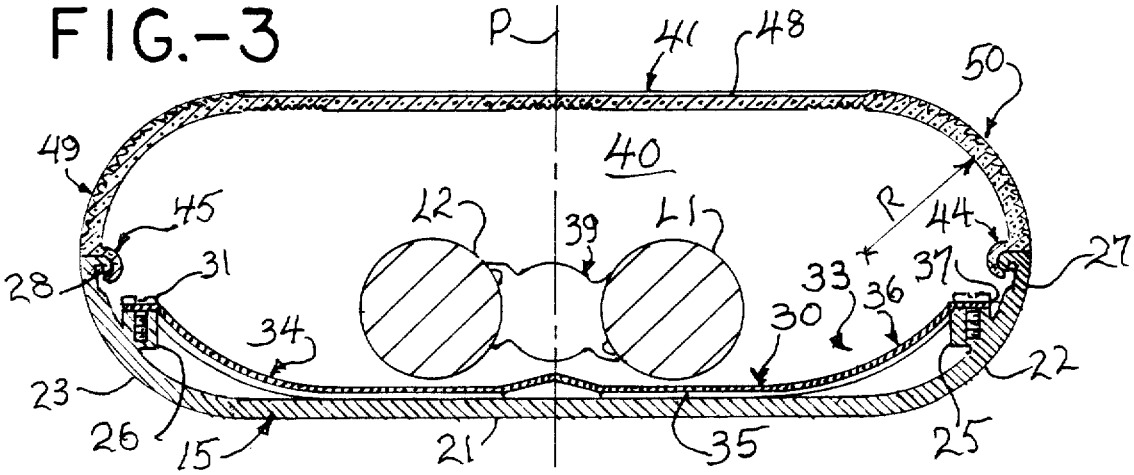

METHOD FOR INDIRECT LIGHTING

Matter enclosed in heavy brackets [ ] appears in the original patent but forms no part of this reissue specification; matter printed in italics indicates the additions made by reissue.

CROSS REFERENCE TO RELATED APPLICATIONS

This application is a division of pending application Ser. No. 742,591, filed June 7, 1985, *now U.S. Pat. No. 4,667,275* which is a continuation of application Ser. No. 046,970 filed June 8, 1979, now abandoned.

BACKGROUND AND SUMMARY

The present invention relates to a luminaire (i.e., the complete lighting unit); and more particularly, it relates to a luminaire which may be used for indirect lighting particularly in large open areas such as are commonplace in modern offices. As will be further explained below, one of the advantages of the invention is that its use is not limited only to open office areas, but rather, it can be carried through to the lighting of hallways, executive suites or conference rooms. However, the invention is particularly suited to provide illumination for typical office situations with efficient use of energy while having those characteristics which recent research has shown to be desirable from a psychological viewpoint.

Modern offices are characterized by large open spaces having a ceiling height normally about eight feet, but which may extend to nine feet. The space may be sectioned for privacy by movable wall partitions. These partitions normally have a height of about five to seven feet.

In considering the lighting requirements for an office, among the more important considerations are the need for individual task lighting, for example, for surfaces approximately two and half feet above the floor, and the need to provide some ambient lighting. The latter is desirable both from a safety standpoint and for psychological reasons, as will be discussed below.

Direct lighting as a source of lighting for offices provides high luminance for task areas, but in general, the quality of lighting is not good in terms of visibility and visual comfort of a person.

Lenses have been used in luminaires employing fluorescent lamps for direct lighting. One type of lens employs individual conical or spherical lenses in a repeating pattern. Another uses parabolic reflectors to direct light downwardly. In both of these systems, a light transmission pattern is created in which the light is directed downwardly and generally confined within an angle of about 45 degrees from the vertical. Further, neither of these systems provides ambient lighting for vertical surfaces which has been found to be a distinct preference and produces feelings of spaciousness and comfort.

Indirect lighting obviates the problem of glare perceived by an observer, but most indirect lighting systems have the disadvantage of collecting dust which gathers on the lamps and any reflectors beneath the lamps, and this is a major source of reduced luminance. Another disadvantage of most indirect lighting systems is a psychological one. Research has shown that human beings have a distinct preference for lighter rooms which are uniformly illuminated. In other words, a person may comfortably perform a task in an area at a relatively low luminance level provided there is a minimum of light available and the luminance pattern does not change substantially within his field of view. If the luminance level is substantially lower than that of the area from which a person enters, there will be a period of adaptation, but once the adjustment has been effected, there is little difficulty in performing tasks if the illumination meets the minimum requirements for the task. Further, people prefer to be able to see the source of light. It provides a sense of perspective and has been found to be a factor to be considered in providing office lighting. As indicated, most indirect lighting systems have as a principal object the generation of light while masking completely the origin of the light.

Lenses have in the past placed above a source of light. Some of these lenses do not generate a pattern of illuminance above the luminaire which is uniform. Either a very bright spot is created above the luminaire (the more common characteristic), or a dark area is generated. In either case, the substantial variation in the illumination pattern on the ceiling is easily perceived and is undesirable. Further, in the case of the bright spot, inefficiency results because most of the light is reflected back to the luminaire rather than being used to light the room.

If a dark area is created on the ceiling, it is undesirable from an aesthetic as well as a psychological viewpoint because of the preferences mentioned above.

The method of the present invention has as a principal object the provision of indirect lighting of large open office systems by achieving a uniform distribution of light (i.e. illumination pattern) on a ceiling over the luminaire as well as by fanning the light out laterally to extend the uniform luminance on the ceiling to adjacent areas not directly above the luminaire. Further, due to the reinforcement and bending of lateral rays, vertical surfaces are illuminated even at a substantial distance from the unit.

Particularly, the method of the invention provides for positioning a source of indirect lighting below a horizontal ceiling surface of an interior space, such as a large open office, and directing a portion of the light from the source of indirect light upwardly to produce a luminance pattern on the surface directly overhead the light source. Another portion of light is redirected by refracting it toward the horizontal so as to fan the source light outwardly from the directly overhead luminance pattern. This laterally refracted light extends from the directly overhead luminance pattern on the horizontal ceiling, producing a laterally extended light distribution pattern that is substantially uniformed and that does not produce contrasting dark areas on the ceiling. The method claimed herein can be achieved by lensed luminaires constructed in the manner described and illustrated herein.

The described and illustrated luminaire includes an opaque housing beneath the source of light which preferably includes two or three fluorescent lamps placed side by side. The length of the lamps helps to distribute the light along the length of the housing.

A lens is mounted to the housing above the source, and in the illustrated embodiment, it includes a generally flat upper portion and lateral portions which curve downwardly and join to the housing to enclose the lamps. The upper portion of the lens includes a flat upper surface and a series of light-diverging prisms on the lower surface, facing the source of light. Adjacent prisms are spaced by a flat portion. The function of the prisms is to refract and diverge incident light, and the function of the flats is to permit incident light to pass between the prisms. The prisms and flats cooperate to provide a uniform pattern of luminance on a ceiling above the luminaire which normally has a high reflectance to provide good indirect lighting qualities. This uniformity is effective when the ceiling is placed about two to three feet above the upper surface of the lens and the effect persists even though the spacing is reduced to one foot.

A reflector is located beneath the light sources in the housing to direct light from the sources out to the lateral portions of the lens. Some of the reflected light is transmitted upwardly to the upper portion of the lens. In the illustrated embodiment there are two lateral lens portions, but only one is necessary, for example, if the luminaire is designed for placement directly on the side of a vertical wall. The lateral lens portion or portions are curved downwardly from the top lens portion to the upper edge of the housing, and they contain a plurality of external prisms extending the length of the lens.

The placement of the source of light in the housing is such that it cannot be seen directly by an observer having an eye level the same height as or slightly above the source. Further, because of the interposition of the lens, the light source cannot be seen directly from any elevation. The lateral lens portions bend the light from the source as well as the light from the reflectors toward the horizontal to "fan" the incident light and thereby extend the uniform pattern of luminance onto portions of the ceiling not directly above the luminaire. A pattern of luminance having substantial uniformity is thus achieved on the ceiling directly over-head and extending a few feet either side of the lens without creating bright spots which cause glare or dark areas on the ceiling, as characterized by some prior luminaires used for indirect lighting. Thus, luminaires of the present invention may be spaced at relatively wide distances if they are associated, for example, with movable wall panels since adjacent luminaires will both exhibit this fanning effect and achieve a luminance for indirect lighting which not only provides uniform ambient lighting but also more than adequate task lighting at the same time.

The fact that the light flux density diminishes as the distance between the luminaire and the point being illuminated increases as well as the fact that the flux density is reduced because the flux density in a plane perpendicular to the source is spread over an extended area for large angles of incidence (i.e. the angle relative to the normal), as is the case for areas not directly above the luminaire, are compensated by the effect of the reflector which routes most of the light from the bottom of the source toward the lateral lens portion, although some is transmitted to the top lens portion because of the size of the lamps. This, as well as the particular prism designs, disclosed below, cooperates to achieve a pattern of substantially uniform luminance which is highly desirable from a psychological standpoint and which achieves uniform task light as well as ambient lighting while reducing the amount of electricity to accomplish this in a large open office area.

The lateral lens portions of the luminaire transmit direct and reflected light from the source to illuminate vertical surfaces such as walls and provide a brighter ambient lighting.

Other objects and advantages of the method of the invention will be apparent to persons skilled in the art from the following detailed description of a luminaire capable of illuminating in an interior space in accordance with the method of the invention.

THE DRAWINGS

FIG. 1 is a side elevational view of a typical movable panel wall system on which a luminaire constructed according to the present invention is mounted;

FIG. 2 is an upper side perspective view of the luminaire of FIG. 1;

FIG. 3 is a transverse cross sectional view of the luminaire of FIG. 2;

FIG. 4 is a fragmentary longitudinal vertical cross sectional view of one end of the luminaire of FIG. 2.

DETAILED DESCRIPTION

Figure 5:
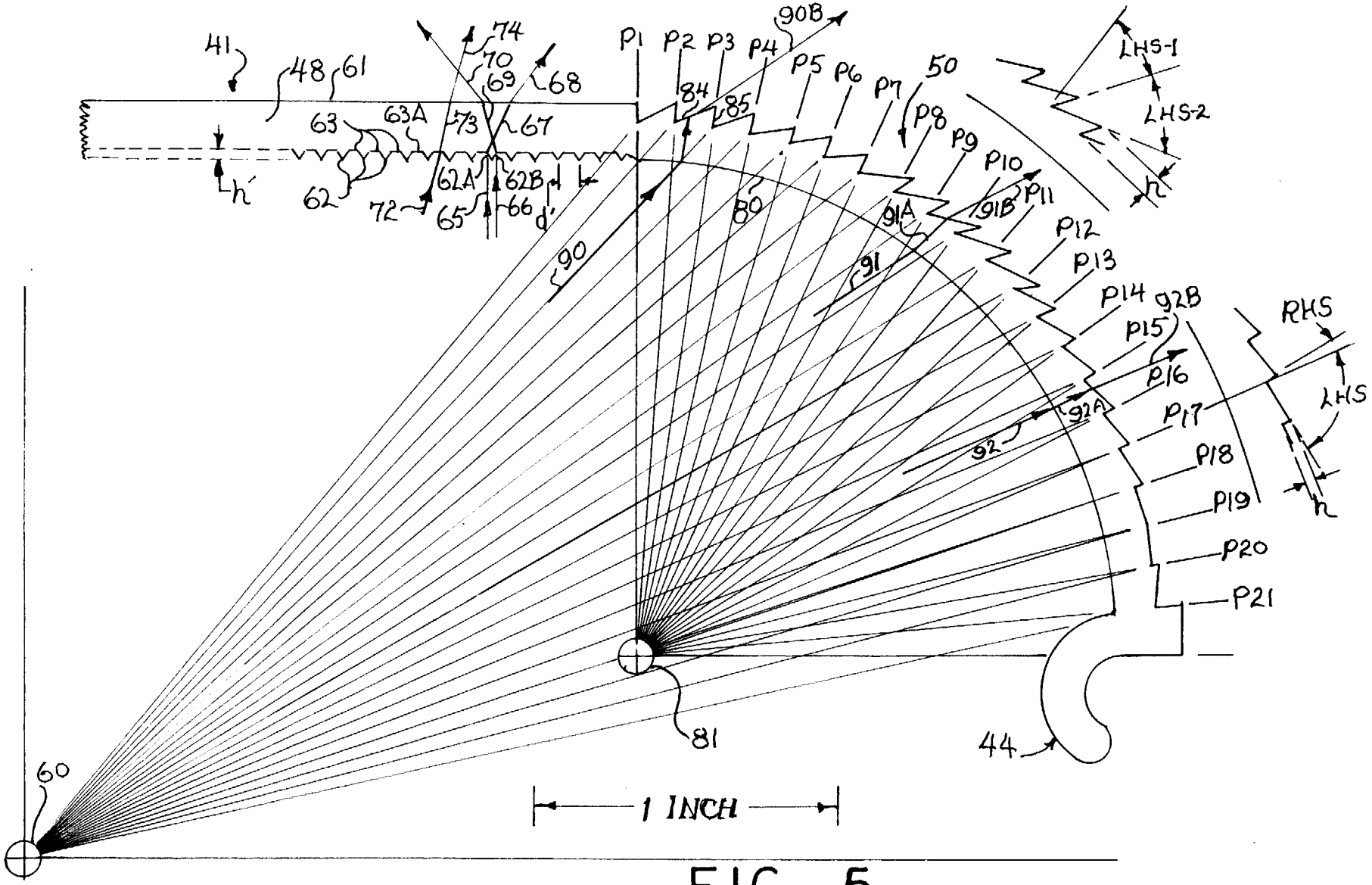
FIG. 5 is a diagrammatic cross sectional view of the right side of a lens incorporated into the luminaire of FIG. 2.

Referring first to FIG. 1, reference numeral 10 generally designates a movable wall panel at the top of which a luminaire generally designated 11 is mounted by means of an upright mount 12 extending from the top of the panel 10. The mount 12 may take the form of a pair of upright arms enclosed in a sheet metal casing.

To illustrate the type of task lighting to which the present invention is directed, a cabinet generally designated 13 may be mounted to the wall panel 10, and a work surface 14 may be provided beneath the cabinet 13.

Turning now to FIG. 2, the fixture 10 is seen to include a housing 15, first and second end caps 17, 18, and an upper lens 19.

As best seen in FIG. 3, the housing 15 includes a generally flat bottom wall 21 and upwardly curved side walls 22, 23. The housing 15 may be formed by extruded aluminum since its cross section is uniform throughout. It is then cut to the desired length.

On the side wall portion 22, there is formed a screw mount 25, and a similar screw mount 26 is formed on the inner surface of the side wall 23. First and second inwardly extending lips 27, 28 are formed at the upper edges of the side walls 22, 23 respectively.

A reflector generally designated 30 is mounted in the housing 15 by screws 31 secured in the screw mounts 25, 26. The reflector 30 is symmetrical about a vertical plane P extending through the longitudinal center of the luminaire to form side halves 33, 34. Thus, the side 33 includes a flat portion 35 beneath a first lamp L1; and to the side of the lamp L1, the reflector is smoothly curved upwardly to form a portion 36, the edge of which is formed into a mounting flange 37. The central portion of the reflector is turned upwardly as at 39. The surface of the reflector may vary according to the effect desired, but for general office use, a specular surface may be used.

The illustrated embodiment includes a second lamp L2 located within the housing 22. Both lamps are mounted between a pair of conventional lamp holders, one of which is shown in FIG. 3 at 39 mounted to a first intermediate wall 40. A third lamp may be used by moving the two lamps shown further apart and inserting a third lamp between them. The center lamp would be raised slightly. The luminaire may also be used with only a single lamp or with a switch for illuminating one, two or three lamps, as desired.

A lens generally designated 41 is mounted to the housing 15 by means of first and second elongated fittings 44, 45 which releasably couple respectively to the inwardly extending lips 27, 28 of the housing 15. Thus, the lens is mounted in such a manner that it can be removed easily, simply by pressing the sides, yet it prevents dust and dirt from entering the interior of the luminaire. The end seals will be described in connection with FIG. 4.

The lens 41 includes an upper lens portion 48, and first and second curved lateral portions 49, 50. The lens 41 is also symmetrical about the plane P. Because both side halves of the fixture operate in a similar manner, the features and advantages of the invention can be achieved simply be extending the housing along the plane P for a luminaire adapted to mount to the vertical surface of a wall, such as in a hall or conference room, as distinguished from the bottom-mounted luminaire shown.

Referring now to FIG. 4, the end cap 17 is seen in detail. It is received on and held to an intermediate wall 53 which serves to mount the lamps and also to support a ballast B in the manner illustrated. Thus, the end cap 17 cooperates with the intermediate wall 53 to provide a housing for the ballast B which may be mounted by means of a flexible grommet 55 to a platform 56 cantilevered from the intermediate wall 53 to reduce noise transmission from the ballast B.

In FIG. 4, there is also shown a gasket 58 which seals the left edge of the lens 41 against the entry of dust into the interior of the luminaire. A similar gasket is provided on the other intermediate wall 40.

Turning now to FIG. 5, which illustrates the structure of one side of the lens 41 in relation to the center of lamp L1, designated 60 in FIG. 5, the top portion 48 of the lens has a flat upper surface designated 61. This facilitates dusting of the fixture and provides no crevices for collecting dust or dirt. The under surface of the top portion 48 of the lens 41 is formed into a plurality of equalateral prisms 62 which extend the length of the lens, and are separated by flat portions or simply "flats" designated 63.

The principal function of the prisms 62 is to cause incident light to diverge through refraction. Consider, for example, parallel incident rays 65, 66 which are incident respectively on the surface 62A and 62B. The ray 65 is refracted and travels along the path 67 through the transparent material of the lens to the upper exit surface 61 thereof where it is again refracted ray 66 follows the path 69 in the lens and emerges along the path 70 from the exit surface 61. Thus, the light which is incident on the surfaces of the prisms 62 is widely dispersed and diverged through refraction.

Light which is incident on one of the flats 63, on the other hand, is simply displaced but remains parallel to the path of the original incident ray. Consider, for example, the ray 72 which is incident on a land designated 63A. It travels along a path 73 within the lens material, but emerges from the exit surface 61 to travel along a path 74 which is parallel to the path of the original ray 72. Because of the size, configuration and spacing of the prisms, the light emerging from the exit surface 61 is diverged in such a manner that the resulting pattern of luminance on a horizontal surface above the luminaire for as close a spacing as one foot is substantially uniform without either bright or dark areas.

In a preferred embodiment, the angle of each of the prisms 62 is 60 degrees; and the height h' is 30 mils. The spacing d' of the prisms is 62 mils, and the thickness of the lens 41 between the exit surface 61 and the flats 63 is 130 mils. These dimensions can be changed without any appreciable change in the results. If the proportion of prisms height to spacing remains the same, the results will be the same. The material of the lens preferably is clear virgin acrylic, although other materials such as Lexon may also be used.

Turning now to the lateral portion 50 of the lens, its principal function is to bend incident light from the source and to "fan" the light out laterally so that it is spread to the side of the fixture on a ceiling and may also be used to illuminate any vertical surfaces in the neighboring vicinity. Because of the reduction in intensity due to the greater distance traveled by the light passing through the lateral portion 50 as well as the fact that the flux will be spread over a greater area of any illuminated horizontal surface due to the increased angle of incidence, a principal function of the reflector 30 and particularly the curvature of the portion 36 is to direct light from the source L1 toward the lateral portion 50 of the lens.

The lateral lens portion 50 of the lens has a uniformly curved, smooth interior surface 80 which has a radius of curvature R centered at 81. The outer surface of the lateral portion 50 of the lens is formed into a plurality of prisms, the points of which are designated respectively P1–P21 for convenience.

Each of the prisms P1–P21 includes an active or emitting surface such as that designated 84 for the prisms P3 from which light incident on the inner surface 80 will emerge, and a second surface 85 referred to as a riser or return surface. The structure of the prisms P1–P21 is illustrated in Table I where the angles RHS, LHS, LHS-1 and LHS-2 are defined in FIG. 5. The dimension "h" is the height of a prism. The nominal thickness of the lateral portion 50 from the uniformly curved surface 80 to the intersection between an adjacent riser 85 of one prism and the active surface of the adjacent prism is 125 mils. Further, the center 60 of the light source is approximately 0.625 inches below the center 81 of the radius of curvature of the surface 80, and approximately two inches to the left of it. It will also be observed that the center 81 is in approximately the same horizontal plane as the upper extension of the curved side 22 of the opaque housing 15. Thus, the light sources cannot be seen directly by an observer whose eye level is the same height as the source.

Because the luminaires are preferably mounted at a height of six to seven feet above the floor (that is, the height to the top of the side wall 22 of the housing 15), a person who is less than about seven feet tall will have a line of sight which will be above the lamps. However, as will be explained presently, he will perceive where the light is coming from.

Still referring to FIG. 5, three light rays are designated 90, 91 and 92; and for purposes of illustration, they are shown as emanating from the center 60 which is an idealized point. In the medium of the lens, the rays take the respective paths 90A, 91A and 92A; and when they exit from the associated active surfaces of the prisms as illustrated, they travel along the paths 90B, 91B and 92B respectively. It can thus be seen that the light from the source is spread out in an increasing pattern from the top to the side edge of the lateral portion 50 of the lens. Further, it is segmented in the sense that an observer viewing the lens from the side at normal angles will see a series of softly glowing horizontal lines and therefore perceive where the light is emanating from. Not illustrated in FIG. 5 for clarity are the rays of light emanating from the source L1 which are reflected by the reflector 30 and directed toward the lateral portion 50 of the lens. As indicated, these rays reinforce the direct rays from the source so that the pattern of luminance on a horizontal surface above the fixture will be substantially uniform and without glare spots or dark areas not only directly above the luminaire but also for a distance of several feet to the side thereof. By providing uniform ambient lighting, as mentioned above, the overall luminance can be maintained at a relatively low level and yet provide adequate task lighting. By bending the light and fanning it out laterally through the lateral portions of the lens, the luminaires can be placed at relatively greater distances than would otherwise be required to achieve complete illumination coverage and uniform luminance. Vertical surfaces in a room employing these luminaires are also illuminated in a substantially uniform manner even at eye level and above, because of light directed from the lateral lens portions and reflected off the ceiling. As mentioned, human perception of whether a room is adequately lighted depends to some extent on whether the vertical surfaces are visibly illuminated.

Still further, it will be appreciated that the lens acts as a dust cover to prevent dust and dirt from reducing the luminance emanating from the source, and because of the upper surface of the top portion of the lens is flat, it facilitates cleaning. It will be observed that at least some light emanates from the riser surfaces of the prisms on the lateral portion of the lens, and this light is directed downwardly below the horizontal. It may not be enough light to provide adequate task lighting but it nevertheless provides a visual image to an observer seated at a work area so that he can see where the light is coming from.

Having thus described in detail a preferred embodiment of the invention, persons skilled in the art will be able to modify certain of the structure which has been illustrated and substitute equivalent elements for those disclosed while continuing to practice the principle of the invention. For example, the dimensions of the lens may be altered without substantially changing the photometric properties of the luminaire, particularly, if the height-to-spacing proportions of the various prisms is maintained. Further, although fluorescent lamps are preferred, other lamps may also be used; and lamps not yet developed may have equal or better results. Finally, the number of lamps or type of ballast are not critical to achieving the overall desired results. It is, therefore, intended that all such modifications and substitutions be covered as they are embraced within the spirit and scope of the appended claims.

TABLE I

| Point | 1 | 2 | 3 | 4 | 5 | 6 | 7 |
|---|---|---|---|---|---|---|---|
| RHS | 0 | 0 | 0 | 0 | 0 | 0 | 0 |
| LHS | 63.9 | 65.2 | 66.4 | 67.6 | 68.8 | 70.0 | 71.1 |
| h | .070 | .067 | .063 | .060 | .057 | .054 | .066 |
| POINT | 8 | 9 | 10 | 11 | 12 | 13 | 14 |
| LHS-1 | 24.1 | 33.3 | 33.3 | 33.3 | 33.3 | 12.1 | 9.8 |
| LHS-2 | 69.0 | 69.0 | 69.0 | 69.0 | 67.8 | 70.4 | 73.0 |
| h | .082 | .082 | .082 | .082 | .070 | .058 | .047 |
| POINT | 15 | 16 | 17 | 18 | 19 | 20 | 21 |
| RHS | 0 | 0 | 0 | 0 | — | 87.2 | 82.5 |

TABLE I-continued

| | | | | | | | |
|---|---|---|---|---|---|---|---|
| LHS | 70.0 | 74.3 | 78.8 | 83.4 | — | 0 | 1.25 |
| h | .054 | .044 | .034 | .017 | — | .017 | .025 |

What we claim is:

1. A method of indirectly illuminating an interior space having a ceiling surface comprising the steps of (1) positioning a source of indirect light at a distance below said ceiling surface, (2) directing a portion of light from said source of indirect light upward to produce a luminance pattern on said ceiling surface directly overhead said source of indirect light, and (3) refracting substantially all of another portion of said source of indirect light laterally of said indirect light source so as to spread same away from said directly overhead luminance pattern to provide a laterally extended overhead distribution of light, *and so that some of said lateral spread of light is directed into viewing angles below the indirect source of light whereby the source of indirect light can be perceived by persons located below and to the side of said source of indirect light.*

2. The method of claim 1 wherein the source of indirect light is comprised of at least one elongated luminaire having a light source, an elongated opaque housing extending upwardly about said light source, and a lens means mounted above the housing having a lateral prismatic lens portion for refracting said other portion of light laterally of said luminaire.

3. The method of claim 2 wherein opposed lateral prismatic lens portions are provided to spread portions of light other than directed overhead away from both sides of said luminaire.

4. The method of claim 1 wherein said interior space includes at least one vertical surface and wherein the light from said source of indirect lighting is laterally refracted sufficiently to illuminate at least the upper portion of said vertical surface.

5. The method of claim 1 wherein the upward directed portion of light is dispersed by a lens media to provide a substantially uniform pattern of luminance on the ceiling surface directly overhead the source of indirect light.

6. A method of indirectly illuminating an interior space having a ceiling surface comprising the steps of (1) positioning a source of indirect light at a distance below said ceiling surface, said source of indirect light including at least one elongated luminaire having a light source, an elongated opaque housing extending upward about said light source, and an elongated lens means having an elongated lateral lens portion disposed generally above said housing, (2) directing a portion of the light from said light source upward from said elongated housing to produce an elongated luminance pattern on the ceiling surface directly overhead said housing, and (3) using said elongated lateral lens portion of said lens means to refract substantially all of a portion of the light from said light source laterally of said luminaire so as to spread same away from said directly overhead luminance pattern to provide a laterally extended overhead distribution of light, *and so that some of said lateral spread of light is directed into viewing angles below the indirect source of light whereby the source of indirect light can be*

*perceived by persons located below and to the side of said source of indirect light.*

7. The method of claim 6 wherein said interior space includes at least one vertical surface and wherein said lateral lens portion is used to refract a portion of light from said light source onto at least the upper portions of said vertical surface.

8. The method of claim 6 wherein said elongated lens means is a full lens cover over said housing and wherein a portion of light from said light source is dispersed to the directly overhead ceiling surface by the upper portion of said lens cover.

9. The method of claim 6 wherein two or more of said luminaires are relatively widely spaced apart under said ceiling to produce a substantially uniform luminance pattern between adjacent luminaires.

10. The method of claim 6 wherein said luminaire is mounted to a moveable partition.

11. The method of claim 8 wherein said luminaire is placed approximately one foot below said ceiling surface.

12. The method of claim 6 wherein said luminaire is mounted on the side of a vertical wall below said ceiling surface.

13. A method of indirectly illuminating an interior space having a ceiling surface comprising the steps of (1) positioning a source of indirect light at a distance below said ceiling surface, said source of indirect light including at least one luminaire having a light source, an opaque housing extending upward about said light source to form at least one opaque sidewall, and lens means having a lateral lens portion extending generally upward from said opaque sidewall, (2) directing a portion of the light from said light source upward from said housing to provide a luminance pattern on the ceiling surface directly overhead said housing, and (3) using the upward extending lateral lens portion of said lens means to refract substantially all of a portion of the light from said light source laterally of said luminaire so as to spread same away from said directly overhead luminance pattern to provide a laterally extended overhead distribution of light.

14. The method of claim 13 wherein said lateral lens portion spreads light to at least one adjacent vertical surface.

15. The method of claim 14 wherein said adjacent vertical surface is illuminated by said lateral lens portion at eye level and above.

16. The method of claim 13, 14, or 15 wherein said luminaire housing and lens means are elongated.

* * * * *